United States Patent [19]
Lorenzo et al.

[11] Patent Number: 5,345,089
[45] Date of Patent: Sep. 6, 1994

[54] SYSTEM AND METHOD FOR OPTICAL SCANNER SENSITIVITY ADJUSTMENT

[75] Inventors: John L. Lorenzo, Southbury; Hans C. Mol, Wilton, both of Conn.

[73] Assignee: Pitney Bowes Inc., Stamford, Conn.

[21] Appl. No.: 996,801

[22] Filed: Dec. 24, 1992

[51] Int. Cl.[5] .............................................. G06K 7/10
[52] U.S. Cl. ..................................... 250/566; 250/568
[58] Field of Search ............... 250/566, 567, 568, 569, 250/570; 235/454, 455, 456, 462

[56] References Cited

U.S. PATENT DOCUMENTS

| | | | |
|---|---|---|---|
| 2,687,253 | 8/1954 | McMillan | 235/61.11 |
| 2,897,370 | 7/1959 | Sauter | 250/219 |
| 2,904,700 | 9/1959 | Rockey | 250/225 |
| 2,946,992 | 7/1960 | Broido | 340/259 |
| 3,361,896 | 1/1968 | Antonio | 235/61.11 |
| 3,531,649 | 9/1970 | Sather | 250/219 |
| 3,588,086 | 6/1971 | Bell | 270/58 |
| 3,613,975 | 10/1971 | Knight | 226/25 |
| 3,628,031 | 12/1971 | Azure, Jr. | 250/210 DC |
| 3,692,983 | 9/1972 | Cucciati et al. | 235/61.11 E |
| 3,820,068 | 6/1974 | McMillin | 340/146.3 AG |
| 3,961,781 | 6/1976 | Funk | 270/20 |
| 4,047,023 | 9/1977 | Key et al. | 250/568 |
| 4,147,295 | 4/1979 | Nojiri et al. | 235/463 |
| 4,162,408 | 7/1979 | Hansen | 250/555 |
| 4,230,265 | 10/1980 | Casaly | 235/455 |
| 4,243,876 | 1/1981 | Engel et al. | 235/455 |
| 4,266,123 | 5/1981 | Friberg | 250/205 |
| 4,364,062 | 12/1982 | Matsui | 346/75 |
| 4,600,841 | 7/1986 | Tokuno et al. | 250/548 |
| 4,659,939 | 4/1987 | Lorenzo | 250/566 |
| 4,857,745 | 8/1989 | Goch | 250/548 |
| 4,864,631 | 9/1989 | Jensen | 382/61 |
| 5,021,674 | 6/1991 | Brunner | 250/561 |
| 5,128,528 | 7/1992 | Heninger | 235/456 |

*Primary Examiner*—David C. Nelms
*Attorney, Agent, or Firm*—Charles R. Malandra, Jr.; Melvin J. Scolnick

[57] ABSTRACT

An optical scanning system comprises an optical scanner, a first circuit for generating a reference pulse and a second circuit for comparing a benchmark pulse scanned by the scanner to the reference pulse. The comparing circuit provides an indicating signal of one of a less than, a greater than and an equal to signals as a result of the comparison. There is a third circuit for adjusting sensitivity of the scanner based on the indicating signal. In one embodiment a visual indication is provided to distinguish between the less than, greater than and equal to signals so that a manual adjustment can be made to the scanner sensitivity. In another embodiment, automatic adjustments are made if a predetermined number of less than or greater than signals are provided before an equal to signal is provided by the comparing circuit.

9 Claims, 6 Drawing Sheets

SYSTEM AND METHOD FOR OPTICAL SCANNER SENSITIVITY ADJUSTMENT

RELATED APPLICATIONS

The subject matter of U.S. application Ser. No. 07/996,286, filed concurrently herewith, is related to the subject matter of this application.

FIELD OF THE INVENTION

The invention disclosed herein relates generally to optical scanning devices, and more particularly to adjustments to optical scanning devices scanning control codes on passing documents.

BACKGROUND OF THE INVENTION

Photodetection of indicia on documents is well known. In such systems, a narrow beam of light is focused as a spot or slit of light on the relevant field to be scanned. The beam of light is moved over the field, either by the deflection of the beam or by movement of the document. Light reflected from, or transmitted through the document is focused on a photocell or other photodetector so that the indicia may be detected as variations of the photocell output. Typically, photocell outputs are small so that the photocell is connected to an amplifier and the amplifier output is further processed by the system.

Scanning indicia is complicated by the fact that the color or shade of the indicia may vary from job to job, changing the background or reference level against which the indicia must be detected. If the reference level is too low, extraneous marks on a document may be detected as indicia. If the reference level is too high, the system will miss parts of the indicia that are faded or lightly printed. In scanning indicia, such as bar codes or dash codes, on a moving document, it is critical that the reference level in an optical scanning system is optimally adjusted to read the scanned code accurately.

An optical scanning system for scanning dash codes is disclosed in U.S. Pat. No. 4,659,939, issued to John L. Lorenzo on Apr. 21, 1987 and assigned to the assignee of the present invention, which is incorporated herein by reference. The optical scanning system includes a potentiometer for adjustment to a sensitivity, or threshold, amplifier. However, dash code scanner sensitivity adjustment has proven to be a difficult task. A technician is needed to perform the adjustment which is a very subjective adjustment that relies on a trial and error method. Although a more precise sensitivity adjustment can be realized using an oscilloscope or other instruments, the adjustments are still subjective in nature and require trial and error.

It is an object of the present invention to provide a system and method which provides a precision sensitivity adjustment to an optical scanning system without the need for an oscilloscope or other instruments.

It is a further object of the present invention to provide a system and method which provides an automatic sensitivity adjustment to an optical scanning system.

SUMMARY OF THE INVENTION

It has been found that the present invention provides one or more "optimal" sensitivity settings which are used to generate a reference pulse to which an actual benchmark dash pulse is compared. Resultant signals from the comparison are used to signal a necessary adjustment to the sensitivity. In one embodiment, the signal is used for a visual display of a manual adjustment required. In another embodiment, the signal is used for automatic sensitivity adjustment. In particular, the present invention eliminates the need for a logic analyzer or scope which typically require a technician to perform the initialization.

In accordance with the present invention, an optical scanning system comprises an optical scanner, a first circuit for generating a reference pulse and a second circuit for comparing a benchmark pulse scanned by the scanner to the reference pulse. The comparing circuit provides an indicating signal of one of a less than, a greater than and an equal to signals as a result of the comparison. There is a third circuit for adjusting sensitivity of the scanner based on the indicating signal. In one embodiment a visual indication is provided to distinguish between the less than, greater than and equal to signals so that a manual adjustment can be made to the scanner sensitivity. In another embodiment, automatic adjustments are made if a predetermined number of less than or greater than signals are provided before an equal to signal is provided by the comparing circuit.

In accordance with the present invention, the first dash scanned on a document, i.e., the benchmark dash, is gated into a one-shot circuit which generates a reference pulse. This reference pulse, in turn, gates clock pulses into a first counter. Simultaneously, the dash pulse itself gates the same clock pulses into a second counter. At the end of an appropriate period, the contents of both counters are compared, and one of three signals (equal to, less than or greater than) is generated. For the embodiment providing manual adjustment, there is an LED dedicated to each of these signals to provide a visual indication of the status of the sensitivity setting in the scanning device. Appropriate adjustments are made, via a sensitivity adjustment potentiometer, to cause the "equal to" LED to light up.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
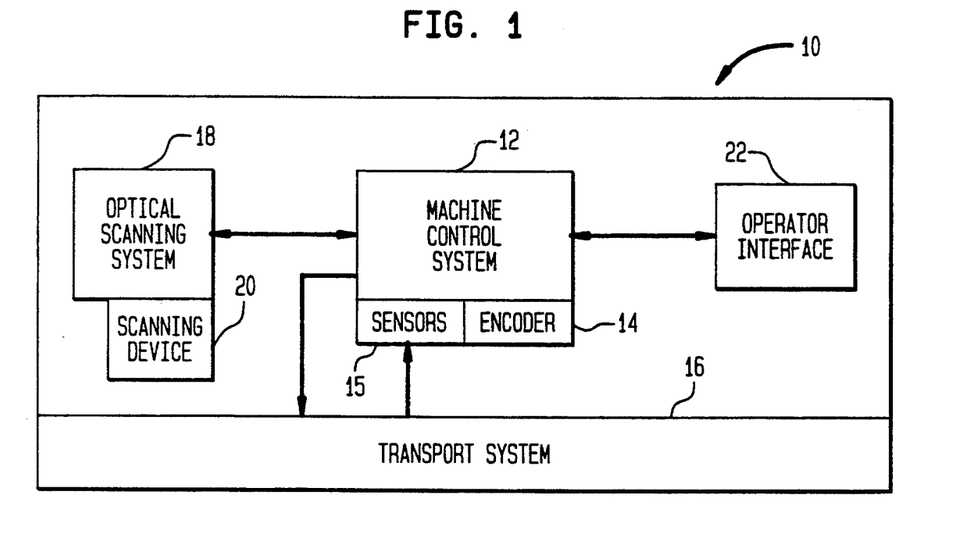
FIG. 1 is a generalized block diagram of a paper handling machine including an optical scanning system.

In describing the present invention, reference is made to the drawings, wherein there is seen in FIG. 1 a block diagram of a paper handling machine, generally designated 10, including a machine control system 12 and an optical scanning system 18. The machine control system 12 includes an encoder 14 which generates timing pulses during machine operation. The machine control system 12 also includes sensors 15 for sensing movement of documents conveyed by a transport system 16. The optical scanning system 18 controls a scanning device 20 which scans coded information printed on the documents conveyed by transport system 16 and sends such information to the machine control system 12. There is an operator interface 22 which provides a machine operator means for monitoring and inputting operational information and operator commands respectively.

An example of the paper handling machine is an inserting machine. See, for example, U.S. Pat. No. 4,547,856, which is incorporated herein by reference for the purpose of general inserting machine control system operation.

Figure 2:
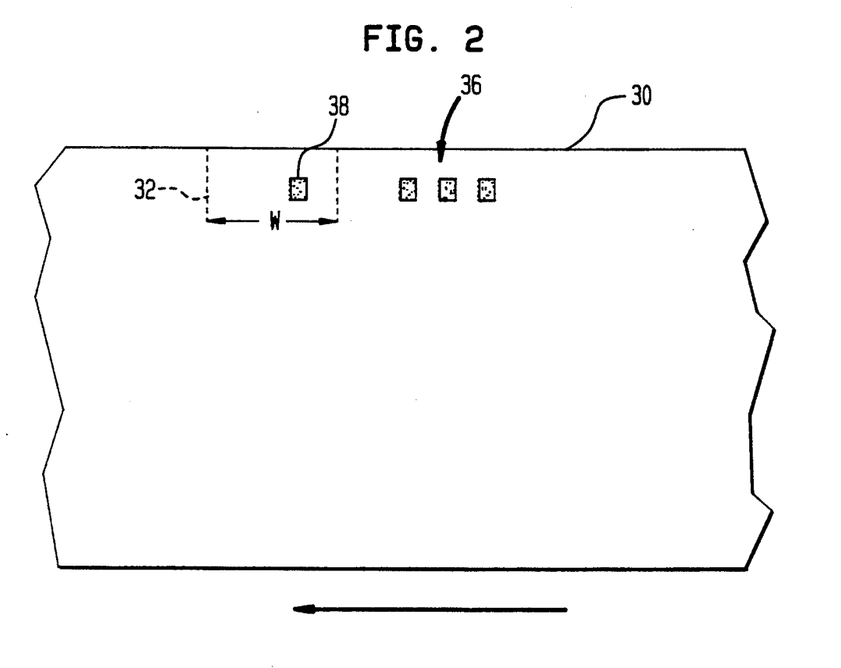
FIG. 2 is a plan view of a document being scanned for control marks.

Referring now to FIG. 2, a document 30, which is moving left to right as shown by the arrow in FIG. 2, has a control code 36 printed thereon. The scanning device (not shown in FIG. 2) begins an active scan of document 10 at a predetermined location 32 on document 30. Typically, this location is determined by sensing the leading edge of the document and counting a specific number of encoder pulses from the leading edge. The scanning device continues to scan for the control code 36 for a predetermined distance from location 32. The length of the active scan relative to a particular position on document 30 is referred to as a detection window W, also referred to as a benchmark window. The benchmark window is the window in which the scanner is scanning for benchmark dash 38.

Figure 3:
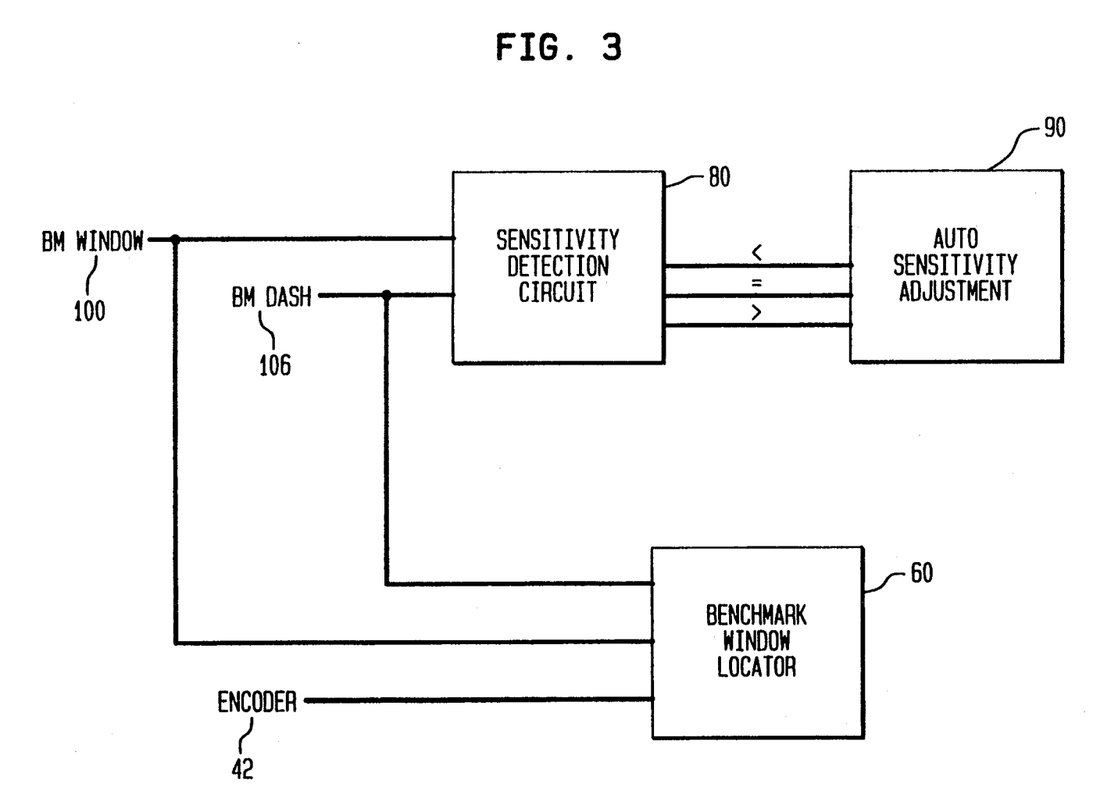
FIG. 3 is a simplified block diagram of a circuit for determining sensitivity level of the optical scanning system, adjusting the sensitivity level and locating a benchmark window in accordance with the present invention.

Referring now to FIG. 3, a sensitivity detection circuit 80 has signals from scanning device 20 (FIG. 2), specifically benchmark dash signal 106 and benchmark window signal 100, as inputs to determine if the benchmark dash is equal to, less than or greater than a reference pulse generated within the circuit. The results of the sensitivity determination are visually displayed for manual adjustment of the scanner sensitivity. The output from sensitivity detection circuit 80 is sent to an automatic sensitivity adjustment circuit 90 which automatically adjusts the scanner sensitivity when a predetermined number of marginal benchmark pulses have occurred successively. There is a benchmark window locator circuit that has benchmark window signal 100, benchmark dash signal 106 and encoder 14 pulses as inputs for determining if the benchmark window is centered about the benchmark dash. Visual indications are provided if adjustments are needed.

Figure 4:
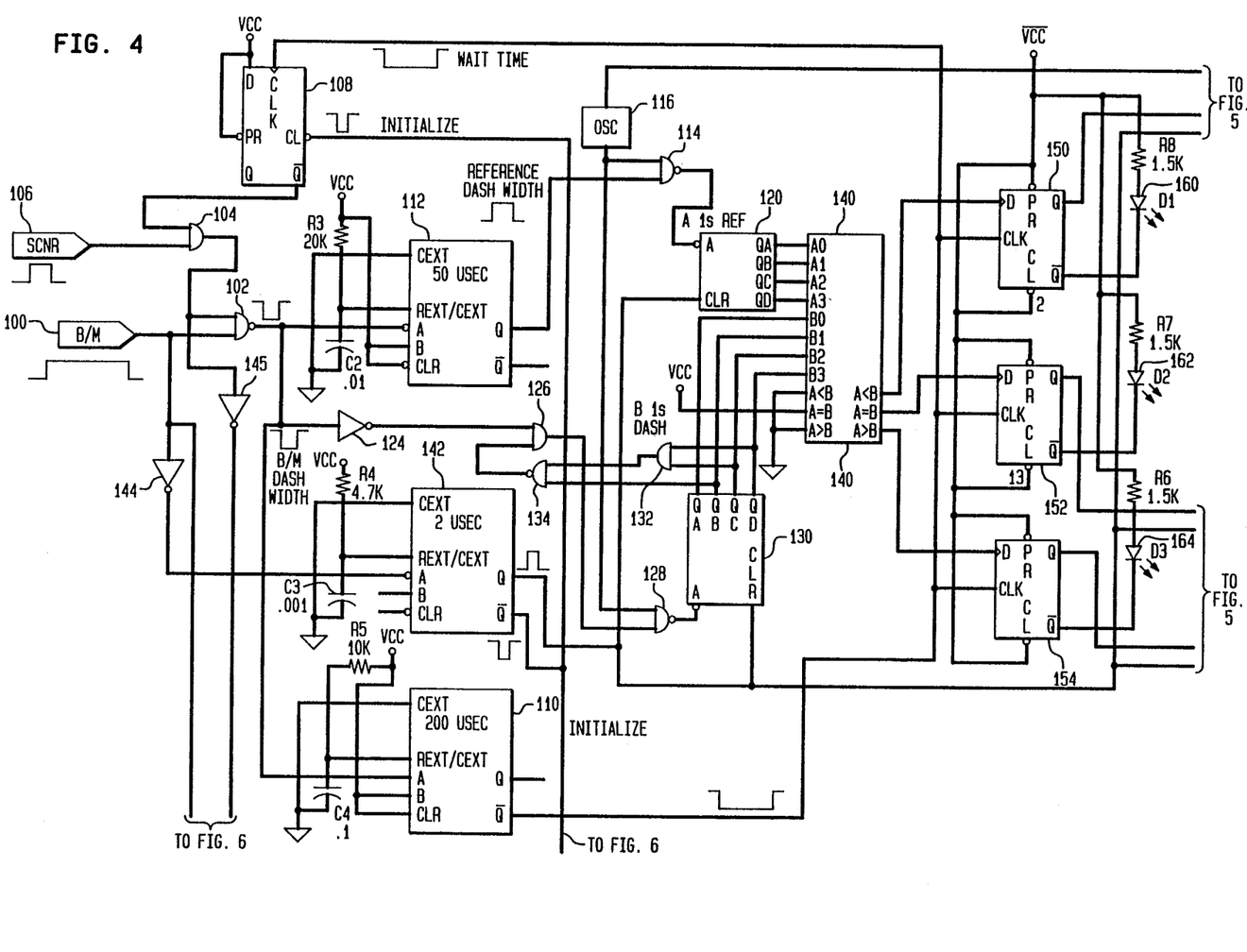
FIG. 4 is a schematic diagram of a circuit for determining optimal sensitivity level of the optical scanning system including automatic sensitivity adjustment.

Referring now to FIG. 4, a circuit is shown which determines whether the sensitivity adjustment of the optical scanning system is at an optimal setting. A benchmark window signal 100 is connected to one of two inputs of NAND gate 102. The other input of NAND gate 102 is connected to the output of AND gate 104. One of the two inputs of AND gate 104 is a scanner signal 106 which provides a dash pulse whenever a dash is scanned.

The other input of AND gate 104 is a $\overline{Q}$ output of FLIP-FLOP 108 which allows the first dash, i.e. the benchmark dash, scanned on a document to be gated through AND gate 104. It is the benchmark dash that activates the circuit. As shown, the input and preset of FLIP-FLOP 108 is connected to a Vcc voltage power supply. The clock input of FLIP-FLOP 108 is connected to the $\overline{Q}$ output of ONE-SHOT 110. In the preferred embodiment of the present invention, ONE-SHOT 110 is connected to Vcc voltage source and a resistor and capacitor circuit which provides a 200 microsecond inverted pulse at the $\overline{Q}$ output. The length of the pulse provides adequate wait time for counts to be established (as will be described later), but is short enough to prevent a second dash from activating the circuit. The A input of ONE-SHOT 110 is connected to the output of NAND gate 102. Thus, the lead edge of the benchmark dash signal 106 triggers ONE-SHOT 110.

The output of NAND gate 102 is also connected to the A input of ONE-SHOT 112 for triggering a reference dash width. In the preferred embodiment of the present invention, ONE-SHOT 112 is connected to the Vcc voltage source and a resistor and capacitor circuit which provides a 50 microsecond pulse at the Q output. This pulse represents the optimal dash width expected from the scanner signal 106. A select switch (not shown) may be added to select from more than one reference pulse width, e.g., 20 microsecond or 100 microsecond.

The Q output of ONE-SHOT 112 is connected to one of the two inputs of NAND gate 114. The other input of NAND gate 114 is from an internal oscillator 116. The output of NAND gate 114 is connected to the A input of counter 120. In this manner, a count proportional to the width of the reference dash is obtained.

The output of NAND gate 102 is also connected to inverter 124, which has an output connected to one of two inputs of AND gate 126. The output of AND gate 126 is connected to one of two inputs of NAND gate 128. The other input of NAND gate 128 is from internal oscillator 116 which provides a proper frequency for counting the width of the benchmark and reference pulses. The output of NAND gate 128 is connected to the A input of counter 130. In this manner, a count proportional to the width of the benchmark dash is obtained. The second input of AND gate 126 is connected to the output of NAND gate 134 which has one of its two inputs directly from a QB output of counter 130. The other input of NAND gate 134 is connected to the output of AND gate 132 which has two inputs from outputs QC and QD of counter 130. In this manner, if counter reaches its maximum count the counter is disabled so that it does not begin a new count. Thus, counter 130 is enabled until the the benchmark dash pulse ends or counter 130 fills up.

The outputs QA–QD of counters 120 and 130 are connected to inputs A0–A3 and B0–B3 of comparator 140 respectively. The A inputs are the count for the pulse width of the reference dash, and the B inputs are the count for the pulse width of the Benchmark dash pulse. If the widths are the same the A=B output of comparator 140 will change from a low to a high state reflecting such a condition. Similarly, if the width of the reference dash pulse is less than the width of the benchmark dash pulse, then the A<B output of comparator 140 will change from a low to a high state reflecting this condition. Finally, if the width of the reference dash pulse is greater than the width of the benchmark dash pulse, then the A>B output of comparator 140 will change from a low to a high state reflecting this condition. As shown, the A<B and A>B inputs of comparator 140 are connected to ground and the A=B input is connected to the Vcc supply voltage.

The Q output of a ONE-SHOT 142 is connected to the CLR inputs of counters 120 and 130 for clearing the counters. The A input of ONE-SHOT 142 is connected to the output of an inverter 144 which has an input from the benchmark window signal. Thus, ONE-SHOT 142 is triggered on the lead edge of the benchmark window to reset counters 120 and 130 before the next benchmark dash is scanned. In the preferred embodiment of the present invention, ONE-SHOT 142 is connected to the Vcc voltage source and a resistor and capacitor circuit which provides a 2 microsecond pulse at the Q output. The $\overline{Q}$ output of ONE-SHOT 142 is connected to the CL input of FLIP-FLOP 108 to initialize FLIP-FLOP 108 which will enable AND gate 104 to pass the scanner output when the benchmark dash 106 is detected.

The outputs A<B, A=B and A>B are connected to the D inputs of FLIP-FLOPS 150, 152 and 154 respectively. As shown, the PR and CL inputs of FLIP-FLOPS 150, 152 and 154 are connected to the Vcc voltage supply. The CLK inputs are connected to the $\overline{Q}$ output of ONE-SHOT 110. Thus, a wait time is provided for the counts to be concluded before the A<B, A=B or A>B output of comparator 140 is clocked into the respective one of FLIP-FLOPS 150, 152 or 154. The $\overline{Q}$ outputs of FLIP-FLOPS 150, 152 and 154 are connected to LED circuits 160, 162 and 164 respectively. If B>A, i.e., the benchmark dash pulse has a greater width than the width of the reference dash pulse, the LED 160 is on to indicate that the sensitivity of the scanning device must be reduced. If B<A, i.e., the benchmark dash pulse has a width that is less than the width of the reference dash pulse, the LED 164 is on to indicate that the sensitivity of the scanning device must be increased. Finally, if B=A, i.e., the benchmark dash pulse has the same width as the width of the reference dash pulse, the LED 162 is on to indicate that the sensitivity of the scanning device at an optimal setting. In the preferred embodiment, LED's 160 and 164 are red to indicate that a sensitivity adjustment must be made, and LED 162 is green. An operator can make the necessary sensitivity adjustment to potentiometer 170 (FIG. 5) when switch 172 is in the manual position.

Figure 5:
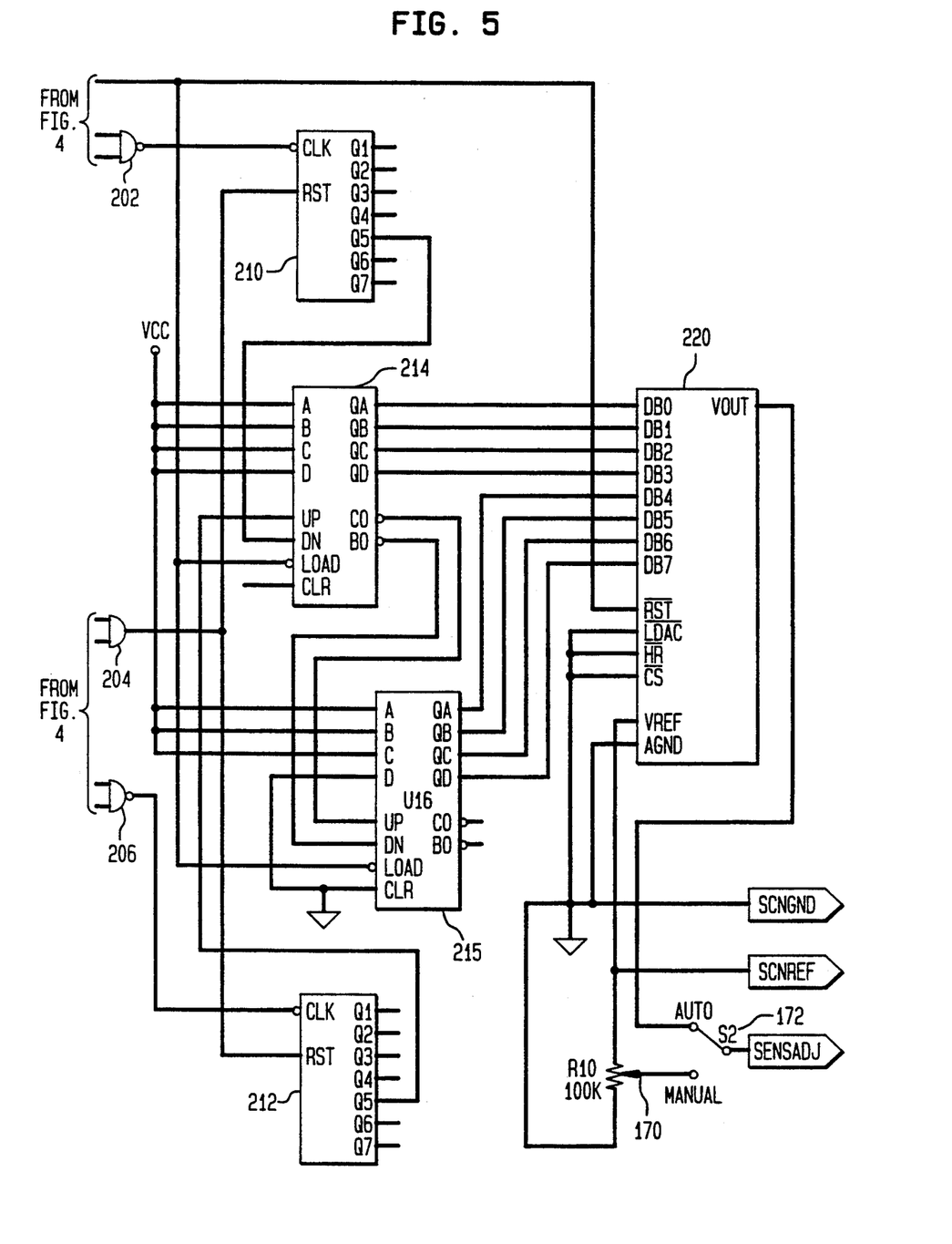
FIG. 5 is a schematic diagram of a circuit for automatically adjusting the sensitivity of a scanner based on the output of the circuit of FIG. 4.

Referring now to FIG. 5, an automatic sensitivity adjustment circuit is shown. The Q outputs of FLIP-FLOPS 150, 152 and 154 (FIG. 4) are connected to one of two inputs of NAND gates 202, 204 and 206 respectively. The other input of each NAND gate 202, 204 and 206 is connected to the Q output of ONE-SHOT 142. The output of NAND gate 202 is connected to the CLK input of a counter 210. The Q5 output of counter 210 is connected to the DN input of two stage counters 214, 215. Likewise, the output of NAND gate 206 is connected to the CLK input of a counter 212, and the Q5 output of counter counter 212 is connected to the UP input of a two stage counters 214, 215. The QA-QD outputs of first stage counter 214 are connected to inputs DB0-DB3 of a digital-analog (D-A) converter 220, and the QA-QD outputs of second stage counter 215 are connected to inputs DB4-DB7 of D-A converter 220. The VOUT output of D-A converter is connected to the sensitivity adjustment of the scanning device when switch 172 is in the auto position. The output of AND gate 204 is connected to the RST input of counters 210 and 212 to reset these counters whenever a good (A=B) benchmark dash is scanned.

As each benchmark dash is detected and its width is compared to a reference pulse width, one of three signals, i.e., greater than, equal to or less than, is generated. So as to avoid an adjustment based upon a single defective benchmark dash, the foregoing automatic circuit detects a trend based upon a predetermined number "n" of consecutive "greater than" or "less than" benchmark dashes. In the preferred embodiment of the present invention, n equals 5. for example, if the benchmark dash begins to deteriorate (A<B), each such benchmark dash causes counter 210 to increment. Similarly, if the benchmark dash begins to exceed the reference dash (A>B), each such benchmark dash causes counter 212 to increment. Any time a good benchmark dash is scanned (A=B), both counters 210 and 212 are reset. When the count of counter 210 reaches 5, this indicates that 5 defective benchmark dashes of the A<B type have occurred since the last good benchmark dash (A=B) has been scanned. This causes the two stage counter 214 to count up. The 8 bit value from counter 214 to the D-A converter is increased causing the voltage out of the D-A converter to increase. When switch 172 is in the automatic position, this increased voltage is sent to the scanner sensitivity adjustment. Similarly, when the count of counter 212 reaches 5, this indicates that 5 A>B benchmark dashes have occurred since the last good benchmark dash. This causes the two stage counter 214 to count down. The 8 bit value from counter 214 to the D-A converter is decreased causing the voltage out of the D-A converter to decrease. When switch 172 is in the automatic position, this decreased voltage is sent to the scanner sensitivity adjustment. Thus, the scanner sensitivity is increased automatically.

Figure 6:
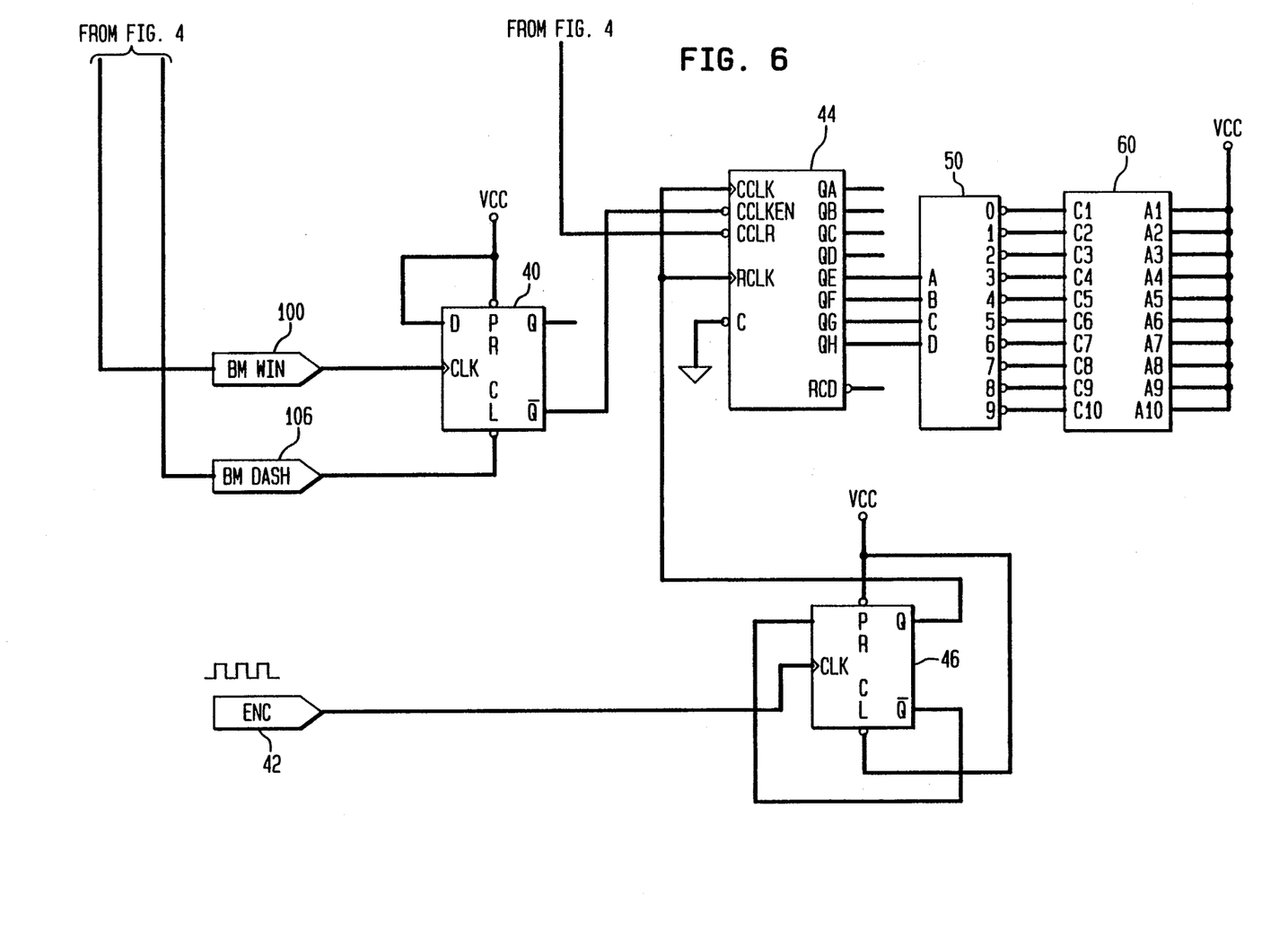
FIG. 6 is a schematic of a circuit for determining the location of a benchmark dash within a benchmark window.

Referring now to FIG. 6, in accordance with the present invention there is shown a schematic of a circuit in the optical scanning system 18 (FIG. 1) which displays a count representing the location of benchmark code 38 printed on document 30 within detection window W (FIG. 2). The CLK input of FLIP-FLOP 40 is connected to the benchmark window signal 100. The output of inverter 145 (FIG. 4), which is effectively the benchmark dash signal 106, is connected to the CL input of FLIP-FLOP 40. The PR and D inputs of FLIP-FLOP 40 are connected to the Vcc supply voltage. The $\overline{Q}$ output of FLIP-FLOP 40 is connected to the CCLKEN input of counter 44. The CCLK and RCLK inputs of counter 44 are connected to the Q output of FLIP-FLOP 46. The Clk input of FLIP-FLOP 46 is connected to the encoder 14 (FIG. 1) pulse signals 42. The $\overline{Q}$ output of FLIP-FLOP 46 is connected to its D input. The Vcc voltage supply is connected to the PR and CL inputs.

The QE-QH outputs of counter 44 are connected to the A-D inputs respectively of decoder 50. The 0-9 outputs of decoder 50 are connected to the C1-C10 inputs of a 10-bar LED 60.

The FLIP-FLOP 40 is triggered by the leading edge 32 of benchmark window W (FIG. 2) which is generated by the optical scanning system 18 (FIG. 1). This results in a benchmark pulse at the output of FLIP-FLOP 40. The benchmark pulse at the output of FLIP-FLOP 40 is terminated by the leading edge of the benchmark dash 38. Thus, the benchmark pulse width is indicative of the location of the benchmark dash 38 in the benchmark window W. The benchmark pulse from the output of FLIP-FLOP 40 enables counter 44 which has is incremented by the output of FLIP-FLOP 46. At the end of the benchmark pulse, the counter will contain the number of encoder pulses between the lead edge of the detection window and the lead edge of the benchmark. This binary value is converted to a decimal value by a 4-line to 10-line decoder 50. In this manner, the detected benchmark dash is detected and processed so as to provide a relative position indication on a 10 bar light emitting diode (LED) 60.

In operation, the lead edge of the benchmark window W enables FLIP-FLOP 40 which in turn enables counter 44. The counter increments a count for each two of the encoder 14 pulses. When the benchmark dash 38 is detected, the lead edge of the detected signal clears FLIP-FLOP 40 which disables counter 44. Then the count existing in counter 44 is loaded into the decoder 50. The output of decoder 50 is displayed in LED 60. The relative position of the benchmark dash within that window is indicated by one of the bars of a 10 bar LED display being illuminated. This provides a visual indication of the relative position of the benchmark dash in the benchmark window.

In the preferred embodiment of the present invention, an operator performs an initialization of the optical scanning system when the benchmark dash 38 is not approximately in the center of benchmark window W. This is accomplished by means of inputting at the operator interface 22 (FIG. 2) an adjustment of the benchmark window position relative to the leading edge of document 30. It will be appreciated by those skilled in the art that an automatic adjustment can be implemented at the machine control system or the optical scanning system.

Figure 7:
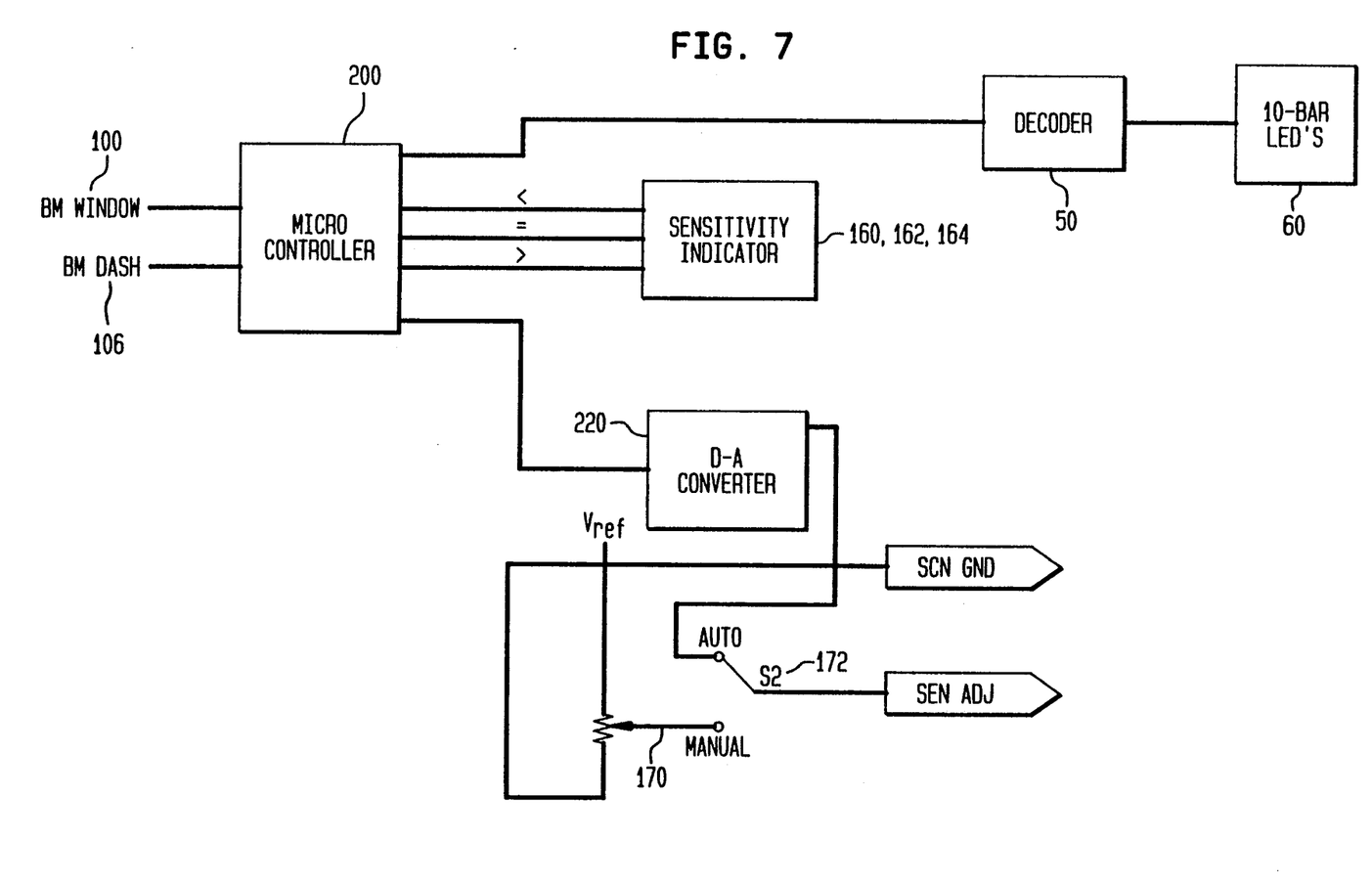

Referring now to FIG. 7, a block diagram is shown with a microcontroller 200 replacing most of the circuitry shown in FIGS. 4, 5 and 6. Microcontroller 200 has signals benchmark window 100 and benchmark dash 106 as inputs. Microcontroller 200 does the processing previously described for FIGS. 4–6, and outputs to LED's 160, 162 and 164 to provide a visual indication of the sensitivity. Microcontroller 200 also outputs to D-A converter 220 which, in turn, outputs a sensitivity adjustment voltage to scanning device 20 when switch 172 is in the auto position. Finally, microcontroller 200 outputs a count to decoder 50 which corresponds to the location of benchmark dash 38 within benchmark window W.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. An optical scanning system, comprising:
    an optical scanner;
    means for generating a reference pulse;
    means for comparing a benchmark pulse scanned by said scanner to said reference pulse, said comparing means providing an indicating signal of one of a less than, a greater than and an equal to signals as a result of said comparison; and
    means for adjusting sensitivity of said scanner based on said indicating signal.

2. The optical scanning system of claim 1, further comprising means for visually indicating said less than, greater than and equal to signals, wherein said means for adjusting sensitivity includes a potentiometer operatively coupled to a reference voltage amplifier in said scanner.

3. The optical scanning system of claim 2 wherein said potentiometer is operable to increase a reference voltage to said amplifier if said less than signal is indicated by said visually indicating means, and said potentiometer is operable to decrease said reference voltage if said greater than signal is indicated.

4. The optical scanning system of claim 1 wherein said means for adjusting sensitivity includes means for automatically increasing a reference voltage of said scanner if a predetermined number of said less than signals are provided by said comparing means before an equal to signal is provided.

5. The optical scanning system of claim 4 wherein said means for adjusting sensitivity includes means for automatically decreasing a reference voltage of said scanner if a predetermined number of said greater than signals are provided by said comparing means before an equal to signal is provided.

6. The optical scanning system of claim i wherein said generating means and said comparing means are performed in a microprocessor.

7. A method for adjusting the sensitivity of an optical scanner, comprising the steps of:
    scanning a benchmark pulse at within a benchmark window;
    generating a reference pulse;
    comparing a length of said benchmark pulse to a length of said reference pulse;
    providing an equal to signal if said benchmark pulse length is equal to said reference pulse length;
    providing a less than signal if said benchmark pulse length is less than said reference pulse length;
    providing a greater than signal if said benchmark pulse length is greater than said reference pulse length;
    increasing a reference voltage of the optical scanner if said less than signal is provided; and
    decreasing the reference voltage of the optical scanner if said greater than signal is provided.

8. The method of claim 7, comprising the further steps of:
    providing a visual indication for each of said less than, greater than and equal to signals; and
    providing a potentiometer to manually increase and decrease said reference voltage.

9. The method of claim 7, comprising the further steps of:
    automatically increasing said reference voltage when a predetermined number of said less than signals are provided before an equal to signal is provided; and
    automatically decreasing said reference voltage when a predetermined number of said greater than signals are provided before an equal to signal is provided.

* * * * *